United States Patent [19]

Arnold, Jr. et al.

[11] 4,393,582

[45] Jul. 19, 1983

[54] METHODS OF AND APPARATUS FOR FORMING A CABLE CORE HAVING AN INTERNAL CABLE SHIELD

[75] Inventors: William S. Arnold, Jr.; Joseph C. Tulloss, both of Baltimore, Md.

[73] Assignee: Western Electric Company, Inc., New York, N.Y.

[21] Appl. No.: 204,429

[22] Filed: Nov. 6, 1980

[51] Int. Cl.3 ........................ H01B 13/20; B23P 23/00

[52] U.S. Cl. ..................................... 29/828; 29/564.1; 29/33 F; 29/825; 174/36

[58] Field of Search ............... 29/825, 33 F, 828, 872, 29/873, 745, 755, 759, 564, 564.1; 174/36; 72/52, 176; 228/148

[56] References Cited

U.S. PATENT DOCUMENTS

| | | | |
|---|---|---|---|
| 1,979,402 | 11/1934 | Nyquist . | |
| 3,602,024 | 8/1971 | Sabroff et al. | 72/176 X |
| 3,622,683 | 11/1971 | Roberts . | |
| 3,803,340 | 4/1974 | Jachimowicz et al. . | |
| 3,825,323 | 4/1975 | Bopp et al. . | |
| 4,165,442 | 8/1979 | Gabriel et al. | 174/36 |
| 4,313,247 | 2/1982 | Stuttard | 29/828 X |

FOREIGN PATENT DOCUMENTS

| | | | |
|---|---|---|---|
| 953384 | 8/1974 | Canada | 174/36 |
| 43-21942 | 11/1968 | Japan | 29/828 |
| 54-8887 | 1/1979 | Japan | 29/825 |
| 1492356 | 11/1977 | United Kingdom | 72/52 |

*Primary Examiner*—Francis S. Husar
*Assistant Examiner*—C. J. Arbes
*Attorney, Agent, or Firm*—E. W. Somers

[57] ABSTRACT

Methods and apparatus of this invention are used to maintain a predetermined arrangement of stranded multi-conductor pair cable units (23—23) within a first group (24) of units while controlling the formation of a laminate (30) comprising a plastic-coated metallic strip (31) into an internal shield which is disposed between the first group and a second group (26) of the units. A device (100) is interposed between faceplates (71, 82) through which the units and the strip are advanced prior to their advance through closing dies (131, 132) and apparatus which encloses the core with a sheathing system. The device controls the formation of the internal shield from the strip and is effective to prevent any buckling of the strip as it is formed into a configuration having arcuate end portions that partially enclose the groups of the units.

7 Claims, 7 Drawing Figures

METHODS OF AND APPARATUS FOR FORMING A CABLE CORE HAVING AN INTERNAL CABLE SHIELD

TECHNICAL FIELD

The present invention relates to methods of and apparatus for forming a cable core which is provided with an internal shield, and more particularly, to the forming of a cable shield which is interposed between two groups of cable units.

BACKGROUND OF THE INVENTION

In communications cables which comprise a plurality of pairs of individually insulated metallic conductors, interference between circuits occurs because of the proximity of the paired circuits. One form of interference is referred to as crosstalk which is the induction of current in one conductor pair, which is commonly called the disturbed pair, by currents flowing in another pair, which is commonly called the disturbing pair.

Various arrangements have been used to reduce crosstalk. One such arrangement includes the use of varying twist lengths among the conductor pairs of a cable. Another arrangement includes a metallic shield that is applied over single conductor pairs of groups of pairs which are then assembled together to form a cable core. Also, cable cores have been assembled by stranding together particularly ones of the conductor pairs to form a center portion, enclosing those pairs that form the center portion with a shield which is often referred to as a screen, stranding additional conductor pairs around the center portion, then applying an outer shield and other sheathing components.

The advent of more recently developed transmission techniques imposed additional requirements on cable shields. In one kind of presently manufactured communications cable, a predetermined number of conductor pairs are formed into a unit and a cable core is formed to include a plurality of these units. With one of the new transmission techniques, the units of a cable core are divided into two groups, one carrying signals in one direction, and the other, signals in opposite direction.

In order to enable signals of the same of different frequencies to be transmitted in opposite directions within a single communications cable, especially when the signals are at carrier frequencies, it is necessary to shield the cable conductors of one group which are used for transmission in one direction electromagnetically from the conductors of a second group which are used for transmission in the opposite direction. Such shielding reduces crosstalk which may occur, for example, when the attenuated currents arriving at a repeater are unshielded from the amplified currents leaving the repeater and entering the other conductors of the cable.

The shielding of one group of cable units from the second group includes a screen that is disposed internally within the core to separate the two groups from each other and that forms part of the cable core. The employment of internal cable shields in communications cables to improve crosstalk characteristics between two groups of conductors therein is taught in U.S. Pat. No. 1,979,402 to H. Nyquist. Of more recent vintage, U.S. Pat. No. 3,803,340 discloses an internal cable shield including a metallic strip formed longitudinally in and with the cable core during a stranding operation in order to separate one group of conductors in the core from another group therein.

One improvement to cable screens has been the utilization of an internal cable shield comprising a plastic-coated metallic strip with the plastic overlying the edges of the metallic strip on the opposite sides thereof. See U.S. Pat. No. 3,622,683. The plastic coating on the metallic strip which is to form the internal shield acts as a dielectric to keep unwanted currents, which may be emitted from pinholes in the insulation of individual insulated conductors, from reaching the metallic strip portion of the shield.

Screens of various configurations have been used with one type being shown in above-mentioned U.S. Pat. No. 3,803,340. In a screen having an S or Z-shaped configuration, not only does the screen separate the groups of units but it has arcuately shaped end portions, each one of which extends around an associated group of units with its outwardly facing surface confronting the inwardly facing surface of an outer metallic shield of the cable.

During the manufacture of a recently designed cable an S-shaped screen comprising a plastic-aluminum laminate is interposed between two groups of cable units. The units and the laminate are advanced through a first facelate of a stranding apparatus where they are separated into two groups with the laminate being partially formed into the final screen configuration. As the units and the laminate are advanced through a second faceplate, the continued formation of the laminate toward its S-shape blocks the lower group of cable units from view by the operator and prevents a visual check of the position of the units within the group. This presents a problem since the position of each unit within its associated group is important to the structure of the cable.

Another problem which occurs during the formation of an internal cable shield is the tendency of the metallic strip from which the shield is formed to buckle as it is caused to enclose the groups of units. The extent of this problem depends on the configuration of the internal shield and the relative imbalance if any between the number and position of the units within each group.

What is needed and what the prior art does not show is the capability of maintaining cable units within a predetermined arrangement while forming a shield that is disposed between groups of the units.

SUMMARY OF THE INVENTION

The above-described problems which have been encountered in the manufacture of internally shielded or so-called screen cables have been overcome by this invention. Apparatus for forming a cable core having a metallic strip which is formed into an internally disposed shield to separate a first group of multi-conductor pair units from a second group of multi-conductor pair units includes a first faceplate having a plurality of openings formed therethrough in two groups. Each of said openings of one group is adapted to permit passage of a stranded cable unit of the first group of units and each of said openings of the other group is adapted to permit passage of a cable unit of the second group of units. The first faceplate also includes a slot which is disposed between the groups of openings and which is adapted to permit passage of a metallic strip therethrough. A second faceplate is spaced from said first faceplate and is capable of having said two groups of units and said strip passed therethrough, said second faceplate having an opening which is common to at least all units of said first group. Each of a plurality of stranded conductor units are advanced along a path of travel through an opening in the first and then through the second faceplate. A metallic strip is advanced along a path of travel which is interposed between the groups of the units and through the slot in said first faceplate to cause said strip to be formed into a configuration having arcuate free end portions each of which encloses at least a portion of one of the groups of units. A guide plate is interposed between said first and second faceplates for engaging the strip being advanced to maintain each of the units of at least the first group of units in a predetermined arrangement. The guide plate cooperates with the second faceplate to cause said strip to be formed into an internally disposed shield of a predetermined configuration. Also, the guide plate includes at least one arcuately configured edge surface which engages portions of the strip as it is advanced between the faceplates and which is effective to control the formation of an arcuately disposed depending portion of the strip which is to enclose the first group of units.

In a method of assembling a plurality of units of insulated conductor pairs and a metallic strip into a core in which the units are separated into groups by the metallic strip, each of a plurality of units of a first group of units of insulated conductor pairs is moved along a path of travel through an associated individual opening in a first faceplate, through an associated individual opening in a guide plate and then through an opening in a second faceplate which is common to at least all the units in the first group. At the same time, each of a plurality of a second group of units of insulated conductor pairs is moved along a path of travel through an associated individual opening in the first faceplate and then through an opening in the second faceplate which is common to at least all units in the second group. Further, a metallic strip which is to form an internal shield in the core is moved through a slotted opening in the first faceplate that is disposed between the groups of openings and through an opening in the second faceplate. The metallic strip is formed into a configuration having a generally central portion that is disposed between the groups and an arcuate portion that is attached to each edge of the central portion and that encloses at least a portion of one of the groups. This is accomplished by engaging at least a portion of the strip which is adjacent to the first group of units between the two faceplates to facilitate the formation of the arcuate portion about the units of the first group.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
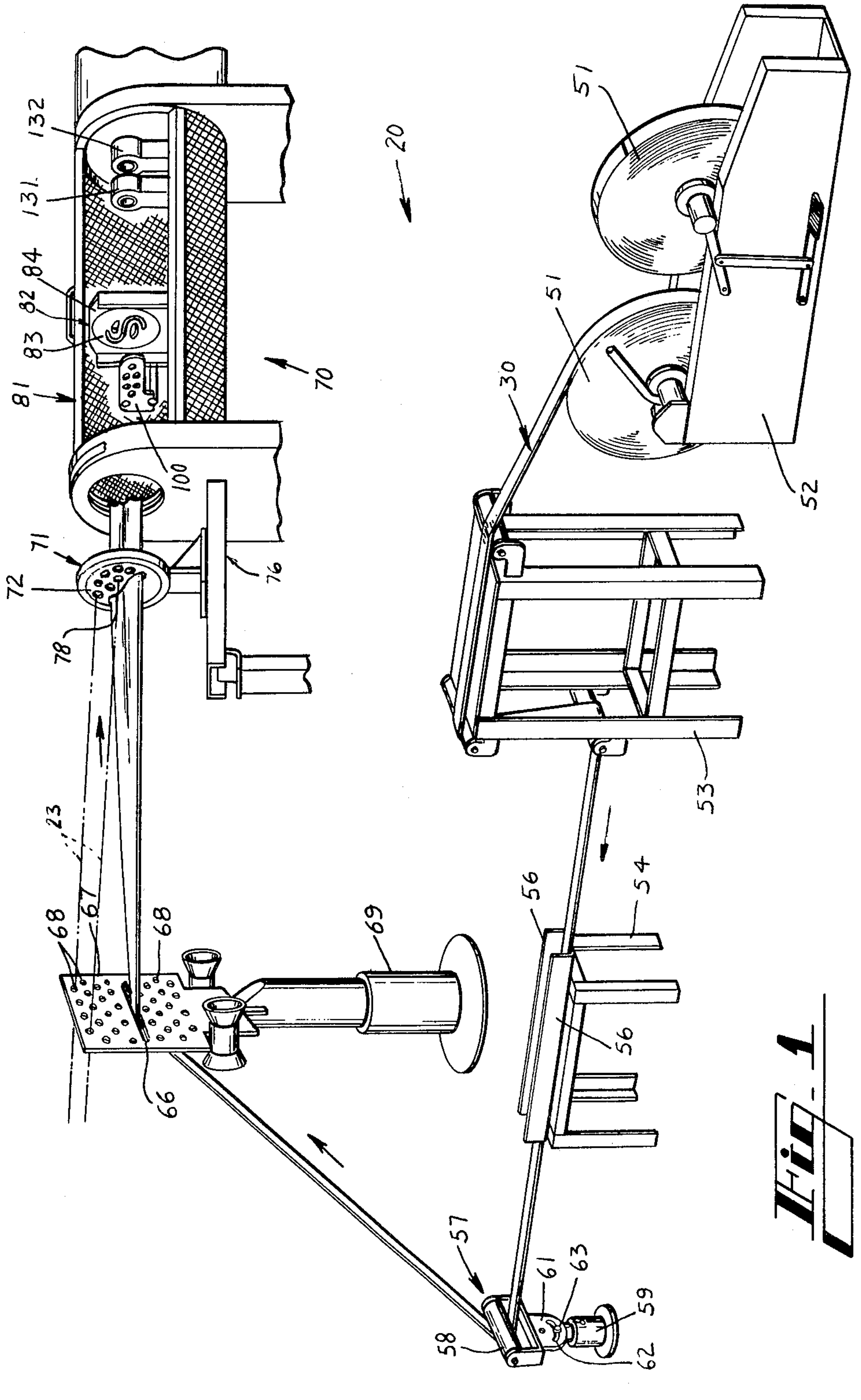
FIG. 1 is a perspective view of a portion of a manufacturing line that is used to make screened cable which includes an internal shield that is formed about groups of conductor units in a core of the cable and shows a plastic-metallic laminate being advanced along a portion of the line.
Figure 2:
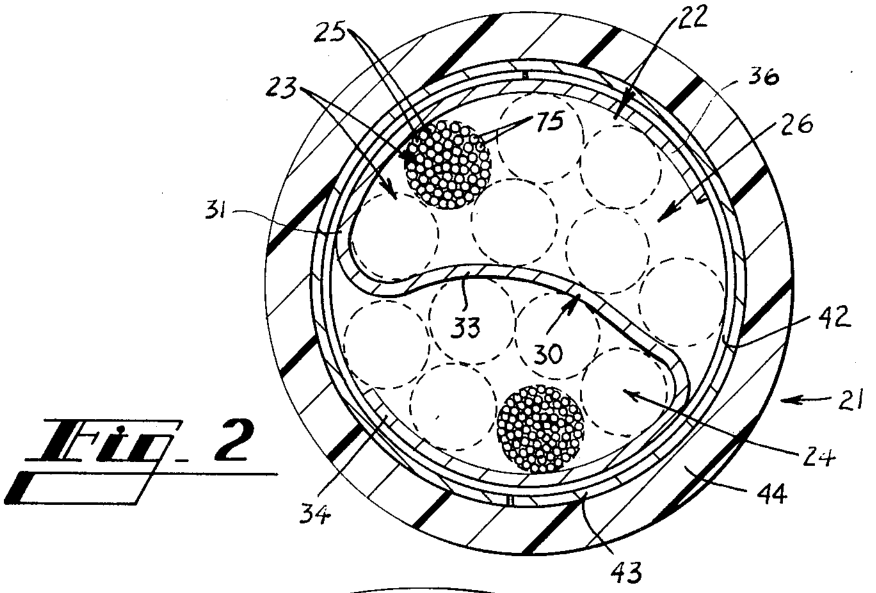
FIG. 2 is a cross-sectional end view of a screened cable which is made by apparatus which includes that shown in FIG. 1.

Viewing now FIG. 1, there is shown an apparatus which is designated generally by the numeral 20 and which is used to make a screened cable. A typical screened cable 21 is shown in FIG. 2 and includes a core 22 comprising a plurality of stranded units 23—23. Each of the units 23—23 includes a plurality of pairs of twisted individually insulated conductors 25—25. As the units 23—23 are stranded together, an identification tape having a distinctive identifying color for each unit is applied to bind the individual stranded units.

The units 23—23 are divided into two groups, one designated 24 and the other designated by the numeral 26, with the units in one group being separated from the units in the other group by a screen 30. The screen 30 is a plastic-metallic laminate with the metallic portion being an aluminum strip 31. The metallic portion is coated with a plastic material such as, for example, Mylar plastic.

The screen 30 of the cable 21 is S-shaped and includes a center portion 33 and two arcuately extending end portions or tails 34 and 36. The one group 24 of the units 23—23 is enclosed between the tail 34 and the center portion 33 while the other group 26 is enclosed between the center portion and the other tail 36. The one group 24 carries signals in one direction while the other group 26 carries signals in the other direction. The plastic coating on the metallic strip 31 acts as a dielectric to keep unwanted currents, which may be emitted from pinholes in the insulation of individual insulated conductors, from reaching the shield.

After the core 22 has been formed with the screen 30 about the groups of units 23—23, it is enclosed in a core wrap, a corrugated aluminum shield 42 and a corrugated steel shield 43 (see again FIG. 2). The shielded core 22 is then covered with a plastic jacket 44 such as one of polyethylene, for example.

Turning again to FIG. 1, there is shown that portion of the manufacturing line which is used to form the strip 31 into the screen 30 interposed between the groups 24 and 26 of units 23—23. The plastic metallic laminate 30 is supplied in rolls 51—51 which are supported in a payoff stand 52. The laminate is advanced past a splicing table 53, through a guide bench 54 comprising a channel formed between two angles 56—56 and then past a turnaround bar 57.

The turnaround bar 57 is used to change the direction of advance of the strip to direct it toward the units 23—23. The turnaround bar 57 comprises a cylinder 58 which is fixedly mounted in a frame that is pivotally mounted on a base 59. The pivotal mounting is accomplished through a trunnion 61 that has an arcuate slot 62 formed therein and through which extends a locking pin 63.

From the turnaround bar 57, the laminate is advanced through a slot 66 of a unit distributing plate 67. The unit distributing plate 67 includes a plurality of openings 68—68 which are distributed into an upper group and a lower group separated by the slot 66 and is supported on a stand 69. As can be seen in FIG. 1, the unit distributing plate 67 is used to bring the plastic-coated strip 31 which is to form the screen 30 into juxtaposition with the units 23—23 which have been priorly stranded. Each of the units 23—23 is passed through an associated one of the openings 68—68 in accordance with a predetermined arrangement of the units into the upper and the lower groups.

The juxtaposing of the strip 31 with the units readies these components for their formation into a core which comprises the two groups 24 and 26 of units 23—23 separated by a screen 30. This formation of the shielded core is accomplished in a closing apparatus which is designated generally by the numeral 70.

Figure 3:
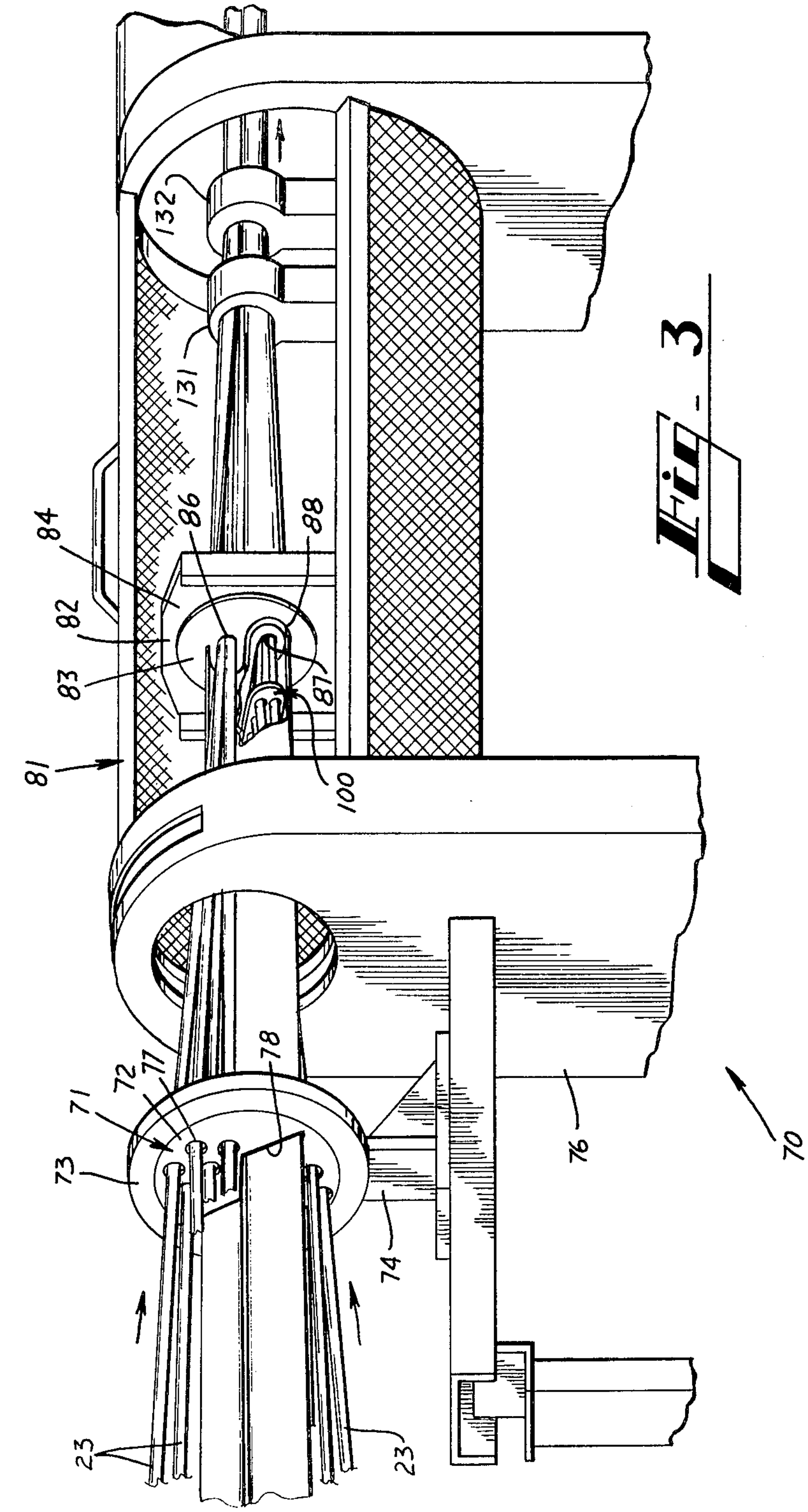
FIG. 3 is an enlarged perspective view of a portion of the line of FIG. 1 and shows a device of this invention which is used to maintain the grouping of cable units and which is used in the forming of a screen about the groups of cable units.

The closing apparatus 70 (see FIG. 3) includes a first faceplate 71 which comprises a circular plate 72 mounted rotatably on a ring 73 that is supported on a base 74 mounted on a stand 76. The plate 72 of the first faceplate 71 includes a plurality of openings 77—77 which are divided into two groups separated by a slot 78. Each of the openings 77—77 is adapted to receive a unit 23 of conductors while the slot 78 is adapted to pass the laminate. As is seen, the slot in the distributing plate 67 is generally horizontal and linear while the slot 78 in the circular plate 72 has a slightly arcuate configuration. This arrangement is used to cause the laminate 30 as it is moved through the first faceplate to begin to assume the S-shaped configuration of the final cable structure.

Figure 4:
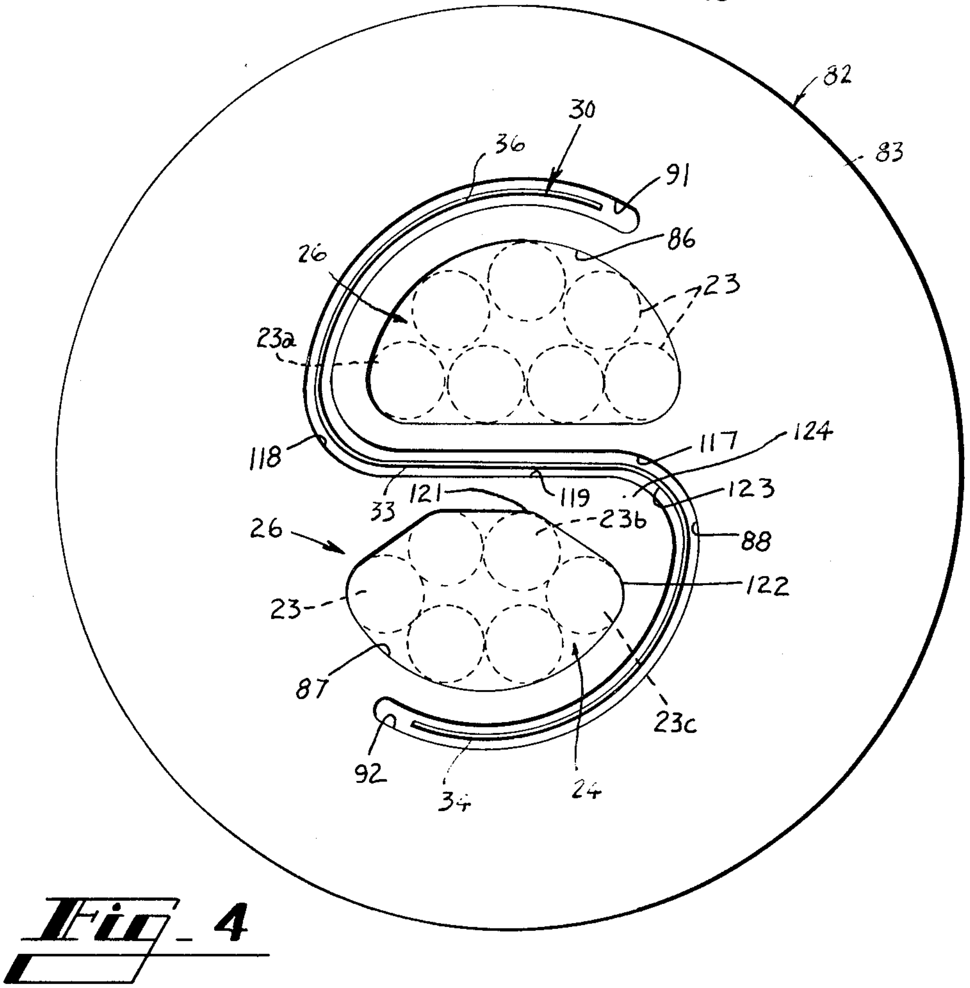
FIG. 4 is a front elevational view of a faceplate through which the laminate and the groups of cable units are advanced.

After the units 23—23 and the laminate 30 pass through the first faceplate, they are moved into a caged former 81 which includes a second faceplate 82 (see also FIG. 4). The second faceplate 82 comprises a circular plate 83 that is supported rotatably in a frame 84. The circular plate 83 is supported so that it can be turned to any rotational position and then maintained in that position by fastener means (not shown). This arrangement permits the plate 83 to be positioned to accommodate the lay which is imparted to the core 22 by a rotating take-up (not shown). This rotational orientation which varies among different cables 21—21 is determined at the beginning of a run with the plate 83 unsecured in its support. After a short length of cable 21 has taken up, the plate 83 will have assumed its natural position determined by that particular cable and its lay and is then locked in position by an operator.

The circular plate 83 includes two openings 86 and 87 each of which is adapted to permit passage of a group of the units 23—23. A well-defined S-shaped slot 88 extends between the openings 86 and 87 with tails 91 and 92 thereof wrapped about the openings 86 and 87 to cause the laminate 30 to enclose their respective groups of units.

Not only is the association of the units 23—23 with a group 24 or 26 predetermined, but the position of each unit within its associated group is also important. Unfortunately, as the internal shield and units 23—23 are moved toward the second faceplate 82, the operator cannot ascertain the positioning of the units of the lower group 24 since the view of that group is blocked by the laminate 30 itself.

This problem is overcome by a device 100 of this invention which is interposed between the first faceplate 71 and the second faceplate 82. An enlarged view of the device 100 is shown in FIG. 5 and of it in operation during advancement of the cable components is shown in FIG. 6.

The device 100 includes a guide plate 101 which is held in a vertical plane by two rods 102—102 that are cantilevered out from a support plate 103 that is attached to the second circular plate 83. The device 100 includes facilitaties for adjusting the horizontal distance "d" (see FIG. 5) that the guide plate 101 is spaced from the second faceplate 82.

Figure 5:
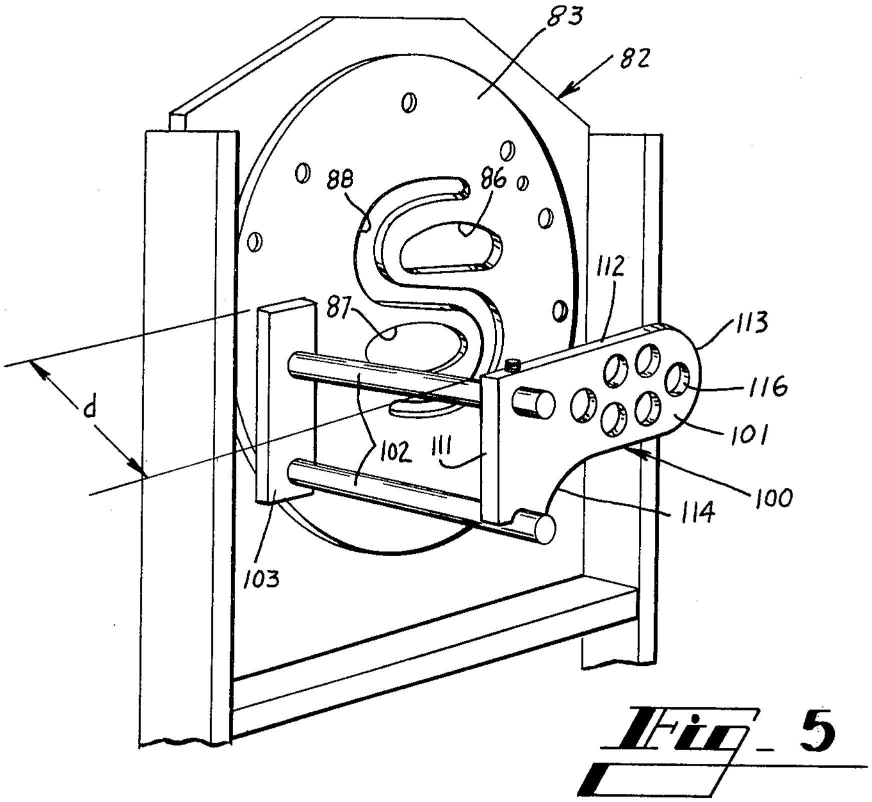
FIG. 5 is an enlarged perspective view of a portion of the apparatus of this invention.
Figure 6:
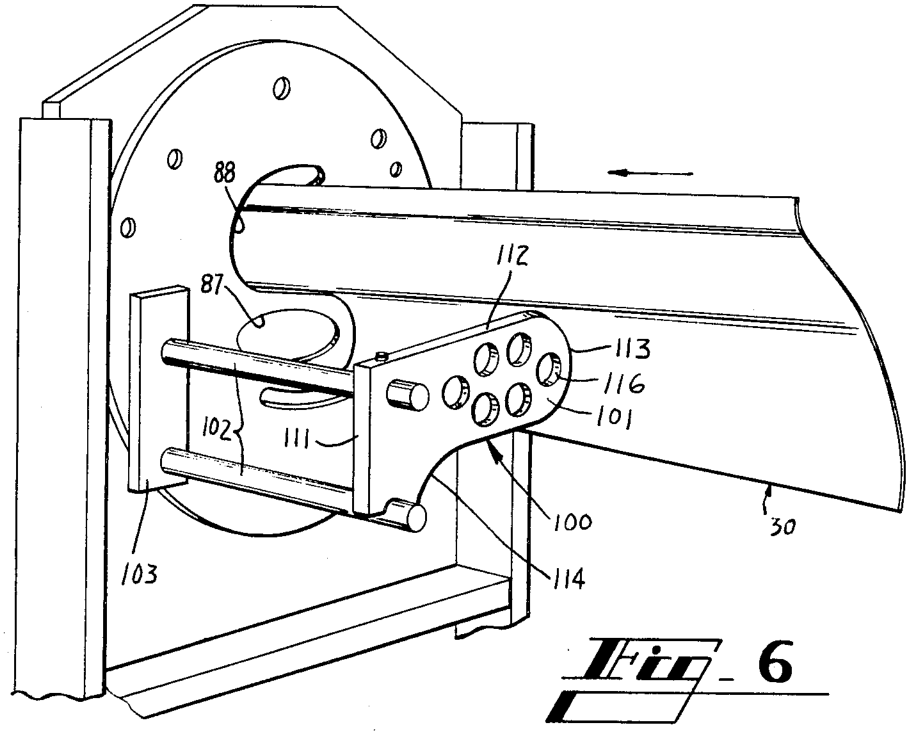
FIG. 6 is an enlarged perspective view of the portion of the apparatus shown in FIG. 5 which shows a laminate in strip form being moved past the device.

As is best seen in FIG. 5, the guide plate 101 has a vertical edge surface 111, a horizontal top edge surface 112, an end arcuate surface or nose 113 and an underside arcuate edge surface 114 that is connected to the vertical edge surface. Further, the guide plate 101 includes a plurality of apertures 116—116 each of which is adapted to permit passage therethrough of a unit 23. The arrangement of the apertures 116—116 varies among cable codes and is accommodated by having a plurality of guide plates available for the manufacturing line with each plate having a particular arrangement of apertures.

The support plate 103 is attached to the circular plate 83 by bolts which extend through slotted holes (not shown). This permits the guide plate 101 to be adjusted in a direction transversely of the path of advance of the units 23—23 as well as in a direction along the path of travel. As a result, the formation of the laminate 30 into an S-shaped screen is capable of being very well controlled.

It has also been found that the configuration of the lateral arcuate side surface 113 of the guide 101 is important to the formation of the screen 30. As can be seen in FIG. 6, the screen engages the lateral arcuate surface of the guide plate 101 as it is advanced therepast. In order to prevent the tails 91 and 92 of the S-shaped screen from being wrapped about the upper group 26 and the lower group 24, respectively, at an angle of a predetermined angle, which in a preferred embodiment is about 120°, the radius of the arcuate lateral portion 113 must not exceed the radius of the portions 117 and 118 of the guide slot in the second faceplate 82. As can be seen in FIG. 4, the portion 117 joins the tail 92 to a linear portion 119 while the portion 118 joins the tail 91 to the linear portion. This arrangement prevents each tail portion from tending to unwind or expand while being moved through the second faceplate.

Besides its functions of maintaining the ordering of the units 23—23 in the lower group and of being effective to control the wrap-around of the upper tail sections of the screen 30, the guide plate 101 is also effective to prevent buckling of the lower tail 92 adjacent to the linear portion. Referring now to FIG. 4, it is seen that the number of units 23—23 in the lower group 24 of a typical configuration is less than the number of units in the upper group 26. This occurs because one of the units 23—23 includes insulated conductors which are used by maintenance personnel for purposes such as testing. Moreover, in that arrangement, it is seen that one of the units 23—23 of the upper groups, unit **23*a* forms a quasi-"mandrel" about which the upper tail can be formed. Of course, it should be realized that the unit 23*a*** is not rigidly fixed and is capable of being moved inwardly but it does offer some support during the forming process.

Going now to the lower group 24, it is seen that because of the reduced number of units 23—23, neither end unit **23*b* nor unit 23*c* (see FIG. 4) occupies a position which causes the tail 92** to conform to it as the laminate 30 is advanced past the faceplate 82. As a result, the lower tail 92 must bridge a distance spanning between a point 121 on the periphery of the unit 23c and a point 122 on the linear portion of the screen. This bridging causes a problem during the forming of the lower tail 92 as the laminate 30 is advanced between the first and the second faceplates 71 and 82. Because of the lack of support over a not insignificant length of travel, it has been found that the laminate 30 tends to buckle in the vicinity of its curved portion 123 adjacent to a space defined by the numeral 124.

This problem is overcome by the apparatus of this invention. The arcuate side edge surface 113 of the guide plate 101 which is interposed between the first and the second faceplates 71 and 82, respectively, is effective to suppport the laminate 30 as it is being formed as well as to provide a substantially fixed mandrel to facilitate the formation of the lower tail 92. It has been found that the use of the device 100 results in a screen which is devoid of buckling particularly in the vicinity of the junctions of the lower tail portion and the linear central portions.

The guide plate 101 is sized with respect to the number of units 23—23 and the width of the plastic-metallic laminate. Because of the mounting, it becomes an easy task for the operator to change guide plates 101—101 as is necessitated by the cable core 22 to be screened. Moreover, the positioning the guide plate 101 in each of three orthogonal directions relative to the guide slot 88 in the second faceplate 82 is facilitated by the mounting of the device 100.

After the screen 30 has been formed about the units 23—23, it together with the units is advanced through a pair of closing dies 131 and 132 (see FIG. 3) which are mounted in the caged former 81. The dies 131 and 132 cause the units 23—23 and the screen 30 to assume a generally circular configuration such as that which is shown in FIG. 2. Subsequently, the core is bound with a binder, or taken up on a rotating take-up (not shown) and moved to a supply station of another line.

The bound core 22 is enclosed in a sheath which may comprise any of several combinations of components dictated by a particular cable construction. For example, the core 22 may be enclosed in the sheath shown in FIG. 2 which comprises the corrugated aluminum shield 42, the corrugated steel shield 43 and the plastic jacket 44. It is important to recognize that this invention is useful in the formation of the screened core nothwithstanding the kind of sheath construction that is to follow.

Figure 7:
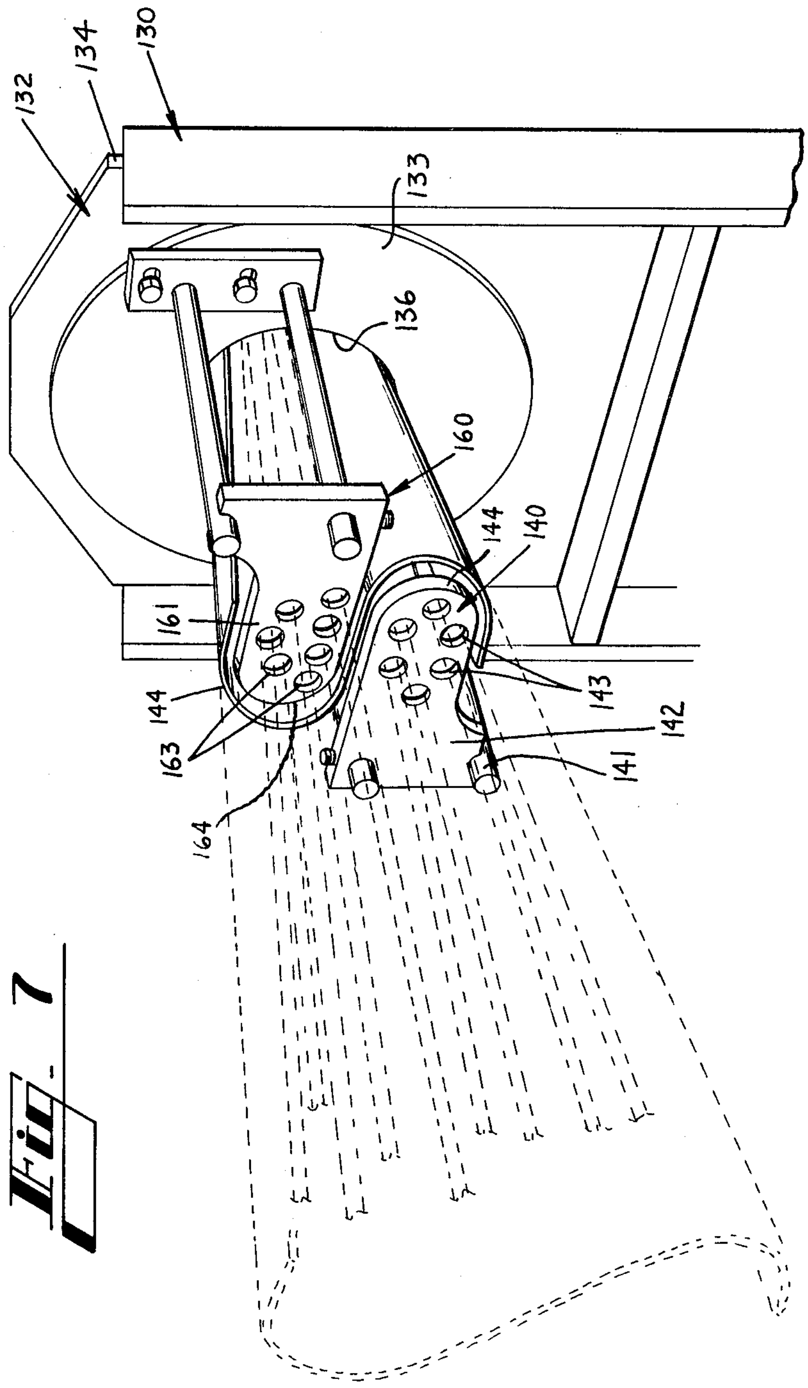
FIG. 7 is an enlarged perspective view of another embodiment of this invention.

Turning now to FIG. 7, there is shown another embodiment of the invention. A closing apparatus 130 includes a first faceplate which is identical to the first faceplate 71 and a second faceplate 132. Unlike the second faceplate 82 of the closing apparatus 70, the second faceplate 132 which includes a circular plate 133 mounted in a support 134, does not include a slot interposed between two openings, but only includes one centrally disposed opening 136. The centrally disposed opening 136 is sufficiently large to permit passage therethrough of the core 22 which includes the two groups 24 and 26 of the units 23—23 with the screen 30 interposed therebetween.

In order to form the strip 31 into the S-shaped screen, the apparatus 130 includes a first device 140 which is identical to the device 100 and which is supported at the end of centilevered rods 141—141 which are attached to the circular plate 133. The device 140 includes a guide plate 142 having an arrangement of openings 143—143 therethrough to correspond to the arrangement of the units 23—23 in the group 24. Moreover, a nose 144 of the guide plate 142 has a radius which does not exceed that of the portion of the screen 30 where the tail 92 is joined to the central, generally linear portion.

This embodiment differs from the priorly described embodiment in that it includes a second device 160 that is supported at ends of cantilevered rods 161—161. The device 160 includes a guide plate 161 which is substantially identical to the guide plate 142 but which is oriented to have a nose 164 thereof directed toward an opposite side of the paths of travel. Moreover, the guide plate 161 which is inverted from the position of the guide plate 142 includes a plurality of openings 163—163 for passing the units of the group 26.

This arrangement of guide plates 142 and 161 is designed to form the strip into the screen or internal shield 30 rather than to supplement a forming slot in the second faceplate 132. Such an arrangement is advantageous in minimizing the possibility of buckling of the screen 30 as it is formed.

The juxtoposition of the two devices 140 and 160 must be carefully controlled to control the configuration of the screen 30. This is accomplished by the mounting of the devices which allow adjustment in any of the coordinate x, y, z directions, the z direction being longitudinal along the supporting rods.

It is to be understood that the above-described arrangements are simply illustrative of the invention. Other arrangements may be devised by those skilled in the art which will embody the principles of the invention and fall within the spirit and scope thereof.

What is claimed is:

1. A method of assembling a plurality of units of insulated conductor pairs and a metallic strip into a cable core in which the units are separated into groups by the metallic strip, said method comprising the steps of:

moving each of a plurality of units of a first group of units of insulated conductor pairs along a path of travel through an associated individual opening in a first faceplate, through an associated individual opening in a guide plate and then through an opening in a second faceplate which is common to all the units in said first group;

moving each of a plurality of a second group of units of insulated conductor pairs along a path of travel through an associated individual opening in the first faceplate and then through an opening in the second faceplate which is common to all the units in said second group;

causing a metallic strip to be formed into a screen which has a generally central portion that is disposed between the groups of units and an arcuate portion that is attached to each end of the central portion with each arcuate portion enclosing at least a portion of an associated group of the units, said step of causing the metallic strip to be formed incuding the steps of moving the strip through a slotted opening in the first faceplate which is disposed between the groups of openings and moving the metallic strip through a slotted opening in the second faceplate which is disposed between the common openings, the slotted opening in the second faceplate having a central portion between the common openings and an arcuate portion that is attached to each end of the central portion; while engaging at least a portion of the strip which is adjacent to the first group of units as the units of the first group are being moved through the openings in the guide plate between the two faceplates to cause one arcuate portion to be disposed in a predetermined manner about the units of the first group without inadvertent deformation of the strip, the steps of moving each of the units of said first group through an individual opening in the guide plate being effective to cause the units of said first group to be maintained in a predetermined position as the metallic strip is being formed about the units of the first and second groups.

2. The method of claim 1, wherein the step of engaging at least a portion of the strip is accomplished with a surface having a radius which does not exceed the radius of a predetermined portion of the arcuate portion of the screen in the assembled core.

3. Apparatus for forming a cable core having an internally disposed shield which separates groups of stranded conductor units that are in a predetermined arrangement, said apparatus comprising:

a first faceplate having a plurality of openings formed therethrough in two groups, each of said openings of one group being adapted to permit passage of a stranded cable unit of a first group of units and each of said openings of the other group being adapted to permit passage of a stranded cable unit of a second group of units, said first faceplate also including a slot which is disposed between the groups of openings and which is adapted to permit passage of a metallic strip therethrough;

a second faceplate spaced from said first faceplate, said second faceplate including a first opening for passing a first group of the units, a second opening for passing a second group of the units, and a slot having an arcuate portion depending from each end thereof;

means for advancing each of a plurality of stranded conductor units along a path of travel through an opening in the first and then through one of the openings in the second faceplate and for advancing a metallic strip along a path of travel which is interposed between the groups of the units and through said slots in said faceplates to cause said strip to be formed into a configuration having arcuate free end portions each of which encloses at least a portion of one of the groups of units; and plate means interposed between said first and second faceplates and cooperating with said slot in said second faceplate for causing said strip to be formed into a screen of a predetermined configuration while preventing buckling of the strip as it is advanced between said faceplates and for controlling the formation of the arcuately disposed portion of the strip that is to enclose the first group of units, said plate means including an arcuately configured edge surface which engages the strip as it is advanced between said first and second faceplates and a plurality of openings in an arrangement which corresponds to that of the units in the first group of the cable units.

4. The apparatus of claim 3, wherein said plate means which is disposed between the faceplates includes a first guide plate having an arcuate edge surface for engaging a portion of the strip which is being advanced and which is to form an arcuate portion about the first group of units and a second guide plate having an arcuate edge surface for engaging another portion of the strip which is to form an arcuate portion about the second group of units.

5. The apparatus of claim 4, wherein said first and second guide plates are disposed in a single plane and have adjacent edge surfaces which form a slot therebetween for passing a portion of the strip which is to correspond to a substantially central portion of the shield between the groups.

6. The apparatus of claim 3, wherein said slot of said second faceplate includes a central portion to each end of which is connected to an arcuate portion, each said arcuate portion being connected to an end of the central portion through a length of a generally circular portion having a radius, said arcuately configured edge surface of said maintaining means having a radius of curvature which does not exceed the radius of the length of the generally circular portion which connects each arcuate portion of said slot in said second faceplate to said central portion.

7. The apparatus of claim 6, which also includes means for mounting said plate means, said mounting means including means for adjusting the position of said maintaining means longitudinally between said first and second faceplates.

* * * * *